Feb. 4, 1969

F. W. LINDBLOM 3,425,774

SPECTACLES WITH HALF MOON LENSES SECURED BY
INTERENGAGING PROJECTIONS AND HOLES

Filed Aug. 30, 1965

INVENTOR.
FRANK W. LINDBLOM
BY
*Barlow & Barlow*
ATTORNEYS

United States Patent Office 3,425,774
Patented Feb. 4, 1969

3,425,774
SPECTACLES WITH HALF MOON LENSES SECURED BY INTERENGAGING PROJECTIONS AND HOLES
Frank W. Lindblom, Warwick, R.I., assignor to Welsh Manufacturing Company, a corporation of Rhode Island
Filed Aug. 30, 1965, Ser. No. 483,536
U.S. Cl. 351—61     2 Claims
Int. Cl. G02c 7/02

ABSTRACT OF THE DISCLOSURE

A pair of spectacles has half moon lenses seated in grooved half rims with pins carried by ears on the lens rims projecting into holes in the upper corners of the lenses to secure the lenses in the rims. The lenses can be readily inserted or removed by forcing the pins out of position by bending the ears which carry them.

---

This invention relates to spectacles of the type which will utilize one half of an elliptical lens usually present in a spectacle.

One of the objects of this invention is to provide spectacles which will afford a normal unencumbered line of vision for the eye when no lens is needed but which will afford a lens for closer work where the user has an eye of such character that some modification for good vision is necessary.

Another object of this invention is to provide a holding means for a pair of half lenses which may be formed of a single piece of material with all of the holding means for the lenses molded as one piece therewith.

Another object of the invention is to provide spectacles which will have an attractive appearance and yet one which is inexpensive to manufacture in quantity.

With these and other objects in view, the invention consists of certain novel features of construction as will be more fully described and particularly pointed out in the appended claims.

In proceeding with this invention, I have molded, as a one-piece structure, a bridge portion with arms extending therefrom which provide the frame for the lenses. Inasmuch as the lenses are semi-elliptical in outline, the arms of the frame are similarly semi-elliptical and are grooved to edgewise receive the lenses therein. The arms are provided with ears at the opposite ends of the upper portion of the lenses to overlap the ends of the upper portion of the lenses, which ears afford a means for holding a pin to extend into the lenses to hold them in the groove. By this arrangement of the ears overlapping a face of the lens at each of the upper opposite corners, the lens does not have to be formed in any unusual shape other than substantially a half elliptical shape with a straight upper edge.

With reference to the drawings, 10 designates generally the holding means for the lenses 11 and comprises a nose bridge 15 having a spanning portion 16 with downwardly extending legs 17. The portion 16 is arched forward slightly as at 18 providing a rearward recess for better accommodation of the nose of the wearer.

Figure 1:
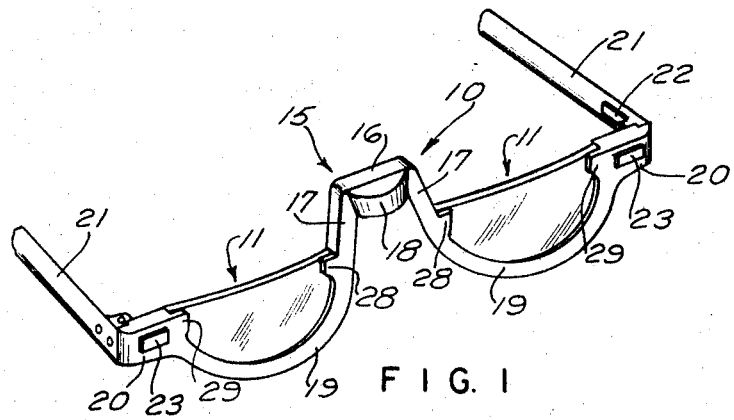
FIG. 1 is a perspective view of the spectacles constructed in accordance with this invention.
Figures 2, 3:
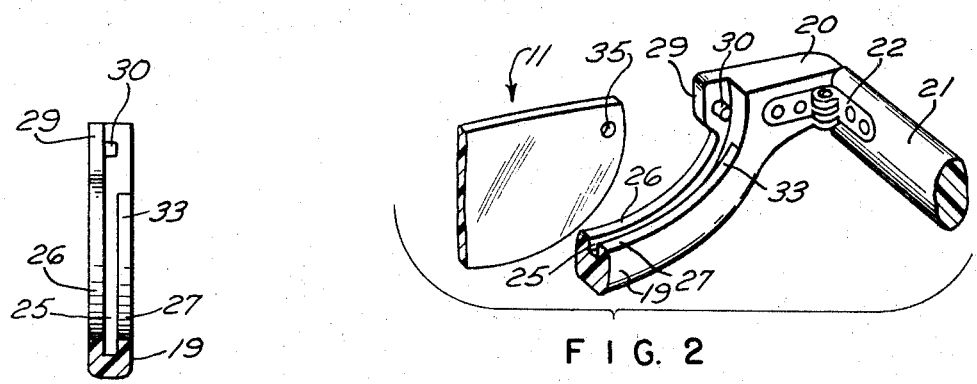
FIG. 2 is a fragmental perspective view with the lens separated from the frame and looking at the rear side of the frame.
FIG. 3 is a sectional view through the frame or an end view of that portion of the frame shown in FIG. 2.

The lens frames comprises a pair of arms 19, one extending from each leg 17 of the bridge, which arms are formed as a continuation of the bridge and are semi-elliptical in shape. These arms terminate in a lug 20 to which a temple 21 is attached by means of a hinge 22 having a rivet plate 23 which shows in the front of the frame. Each of these arms 19 is grooved on its upper surface as seen more clearly at 25 in FIG. 2, the groove being generally channel shape throughout the major portion of its extent with opposite walls 26 and 27 extending from the bottom of the groove. The front wall 26 is of substantially uniform height from the bottom of the groove throughout its extent and is provided with an ear 28 at the portion thereof which is adjacent the bridge and is also provided with an ear 29 at the temple end of the arm which is distant from the bridge. A pin 30 extends rearwardly from the ear 29 and may be molded as an integral part of the ear 29 in the molding operation of the frame.

The wall 27 which extends from the bottom of the groove 25 on the rear side of the frame is of the same height as the wall 26 for the major portion of its extent along the arcuate portion of the elliptical frame but tapers off as at 33 as it approaches the position of the ear 28 or ear 29 so as to be substantially flush with the bottom of the groove as it reaches the location of the ears 28, 29.

The semi-elliptical lens 11, the lower half of an ellipse having a major horizontal axis, is provided with a hole or recess 35 at its upper opposite ends near the horizontal axis of the ellipse at the location where the lugs 28 and 29 will overlap the front face of the lens, this hole 35 being in such a location that it will register with the pin 30 which is extending rearwardly from each ear. For assembly of the lens in the frame, the edge of the lens is positioned in the lower part of the arm 19 with its upper portion tipped rearwardly and there is sufficient flexibility of the frame so that the lens may be moved rearwardly substantially its thickness by twisting the arm of the frame, thus affording an opportunity to register the pin 30 with the opening 35 which will snap into the opening and then the resiliency of the frame will cause it to move back into substantially a vertical plane with the pin in the opening 35. With the pin so located the pin will prevent upward movement of the lens out of the groove and thus lock it in position.

I claim:

1. Spectacles comprising a nose bridge, downwardly curved semi-elliptical arms on each side of said bridge, each arm having an upwardly opening groove therein terminating short of the ends of said arm, a semi-elliptical lens in the groove of each arm and having opposite faces and extending above said groove, said lens having holes in the portions above said groove, a pair of ears on each arm beyond said groove with one ear extending over the front face of the lens at the nose bridge portion of said arm and the other ear extending over the same face of the lens at the end portion of the arm distant from said bridge and a pin fixed to and extending from each ear into said holes to hold the lens in position in said groove whereby the lens may be positioned in said groove and moved along said pins until said pins locate in said holes.

2. A spectacle as in claim 1 wherein said nose bridge and frame with arms, ears and pin are of one-piece molded material.

References Cited

UNITED STATES PATENTS

| | | | |
|---|---|---|---|
| 956,690 | 5/1910 | Donaldson | 351—61 |
| 2,552,409 | 5/1951 | Ditto | 351—108 |
| 2,671,379 | 3/1954 | Eloranta | 351—103 X |
| 2,880,649 | 4/1959 | Eisler | 351—61 |
| 3,017,806 | 1/1962 | Stolper | 351—106 |

DAVID SCHONBERG, *Primary Examiner.*

J. W. LEONARD, *Assistant Examiner.*

U.S. Cl. X.R.

351—106, 149